(12) United States Patent
John et al.

(10) Patent No.: US 8,984,653 B2
(45) Date of Patent: Mar. 17, 2015

(54) CLIENT CONTROLLED LOCK FOR ELECTRONIC DEVICES

(75) Inventors: Mark St. John, Covington, WA (US);
Martin Holladay, Bremerton, WA (US);
Todd Carpenter, Monroe, WA (US);
James Duffus, Seattle, WA (US);
Ricardo Lopez-Barquilla, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1315 days.

(21) Appl. No.: 12/061,670

(22) Filed: Apr. 3, 2008

(65) Prior Publication Data
US 2009/0254995 A1    Oct. 8, 2009

(51) Int. Cl.
G06F 17/30    (2006.01)
G06F 21/74    (2013.01)
G06F 21/88    (2013.01)

(52) U.S. Cl.
CPC ............. *G06F 21/74* (2013.01); *G06F 21/88* (2013.01)
USPC .............................................. 726/27; 726/26

(58) Field of Classification Search
USPC ....................................... 726/27, 26; 713/194
See application file for complete search history.

(56) References Cited

U.S. PATENT DOCUMENTS

| | | |
|---|---|---|
| 4,574,350 A | 3/1986 | Starr |
| 5,613,139 A | 3/1997 | Brady |
| 5,748,084 A | 5/1998 | Isikoff |
| 5,757,616 A | 5/1998 | May et al. |
| 5,768,382 A | 6/1998 | Schneier et al. |
| 5,892,906 A | 4/1999 | Chou et al. |
| 6,308,209 B1 | 10/2001 | Lecheler |
| 6,367,017 B1 | 4/2002 | Gray |
| 6,556,894 B1 | 4/2003 | Nguyen |
| 6,618,810 B1 | 9/2003 | Dirie |
| 6,633,964 B2 | 10/2003 | Zimmer et al. |
| 6,738,810 B1 | 5/2004 | Kramer et al. |
| 6,912,663 B1 | 6/2005 | Dayan et al. |
| 7,149,854 B2 | 12/2006 | Weber et al. |
| 7,228,390 B2 | 6/2007 | Rischar et al. |
| 7,257,814 B1 | 8/2007 | Melvin et al. |
| 7,318,173 B1 | 1/2008 | Falik et al. |

(Continued)

FOREIGN PATENT DOCUMENTS

| | | |
|---|---|---|
| EP | 0433095 B1 | 8/1997 |
| WO | 2008/032493 | 3/2008 |
| WO | WO 2008032493 A1 * | 3/2008 |

OTHER PUBLICATIONS

Michael "Lock down the BIOS to defend against rogue users", http://articles.techrepublic.com.com/5100-1009-6186436.html, May 24, 2007, pp. 1-3.

(Continued)

*Primary Examiner* — Baotran N To
(74) *Attorney, Agent, or Firm* — Steve Wight; Judy Yee; Micky Minhas

(57) ABSTRACT

An electronic device can be locked and secured by activating a hardware locking mechanism on the device. The locking mechanism is controlled by a locking policy that is defined and implemented from the client side. If the locking mechanism is activated, then the device operates in a limited mode of operation instead of in a normal mode of operation. The locking mechanism can be deactivated, placing the device into the normal mode of operation, when a specified condition is satisfied.

20 Claims, 3 Drawing Sheets

(56) References Cited

U.S. PATENT DOCUMENTS

| | | |
|---|---|---|
| 7,406,446 B2 | 7/2008 | Frank et al. |
| 7,421,413 B2 | 9/2008 | Frank et al. |
| 7,451,478 B2 | 11/2008 | Yang |
| 7,669,048 B2 * | 2/2010 | Frank et al. ............... 713/2 |
| 2002/0123964 A1 | 9/2002 | Kramer et al. |
| 2002/0173977 A1 | 11/2002 | Dutta |
| 2002/0198834 A1 | 12/2002 | Kramer et al. |
| 2003/0004875 A1 | 1/2003 | Kramer et al. |
| 2003/0084341 A1 | 5/2003 | Ramachandran et al. |
| 2003/0135380 A1 | 7/2003 | Lehr et al. |
| 2004/0158702 A1 | 8/2004 | Tasaki |
| 2005/0193144 A1 * | 9/2005 | Hassan et al. ............. 709/238 |
| 2005/0273588 A1 | 12/2005 | Ong et al. |
| 2006/0064577 A1 | 3/2006 | Chiu et al. |
| 2006/0107329 A1 | 5/2006 | Frank et al. |
| 2006/0136736 A1 | 6/2006 | Yang |
| 2006/0156008 A1 | 7/2006 | Frank |
| 2006/0165005 A1 | 7/2006 | Frank et al. |
| 2006/0206718 A1 | 9/2006 | Frank et al. |
| 2006/0236084 A1 * | 10/2006 | Wu et al. ..................... 713/2 |
| 2007/0061268 A1 | 3/2007 | Herold et al. |
| 2007/0061535 A1 | 3/2007 | Xu et al. |
| 2007/0150681 A1 | 6/2007 | Frank et al. |
| 2008/0184360 A1 * | 7/2008 | Kornilovsky et al. ......... 726/17 |
| 2009/0005074 A1 * | 1/2009 | Kahn et al. ............... 455/456.2 |
| 2009/0070598 A1 * | 3/2009 | Cromer et al. ............... 713/193 |
| 2009/0150970 A1 * | 6/2009 | Hinds et al. ................... 726/1 |
| 2010/0197273 A1 * | 8/2010 | Uchida ........................ 455/411 |

OTHER PUBLICATIONS

"Locking a Replacement Hard Disk for the Xbox", http://www.xbox-hq.com/html/xbox-tutorials-18.html.

Tony Goodfellow, "Protected Area—Locking Proposal", Jun. 23, 1999, pp. 1-21.

Office Action Summary; U.S. Appl. No. 11/612,435, filed Dec. 18, 2006; First Named Inventor: William J. Westerinen; Mailing Date: May 27m 2009; pp. 13.

Prosecution documents of U.S. Appl. No. 11/515,410, filed Aug. 31, 2006; First Named Inventor: Alexander Frank.

\* cited by examiner

CLIENT CONTROLLED LOCK FOR ELECTRONIC DEVICES

BACKGROUND

Businesses and individuals routinely store private information on computer systems. Maintaining the security of that information is of paramount importance. However, personal computers are frequently left unattended in homes and offices, making them susceptible to theft and/or unauthorized use. Because of their portability and value, devices such as laptop and notebook computer systems, cell phones, personal digital assistants (PDAs), portable media players, video game players, and other types of hand-held devices are also susceptible to theft and unauthorized use.

A number of techniques are available to deter adversaries such as thieves, including identity thieves. For example, devices and private information can be password-protected, and private information can be encrypted. However, adversaries have learned how to circumvent many of these safeguards. In addition, these techniques do little to discourage people who may be more interested in the device itself rather than the information contained on the device. For the most part, these techniques do not keep someone from stealing a device, wiping it clean of information including any safeguards that may be in place, and then selling the device or using it as their own.

Accordingly, a method or system that makes a device more secure and/or that diminishes its value if stolen would be valuable.

SUMMARY

An electronic device can be locked and secured by activating a hardware locking mechanism on the device. The locking mechanism is controlled by a locking policy that is defined and implemented from the client side. If the locking mechanism is activated, then the device operates in a limited mode of operation instead of in a normal mode of operation. The locking mechanism can be deactivated, placing the device into the normal mode of operation, when a specified condition is satisfied.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Figure 1:
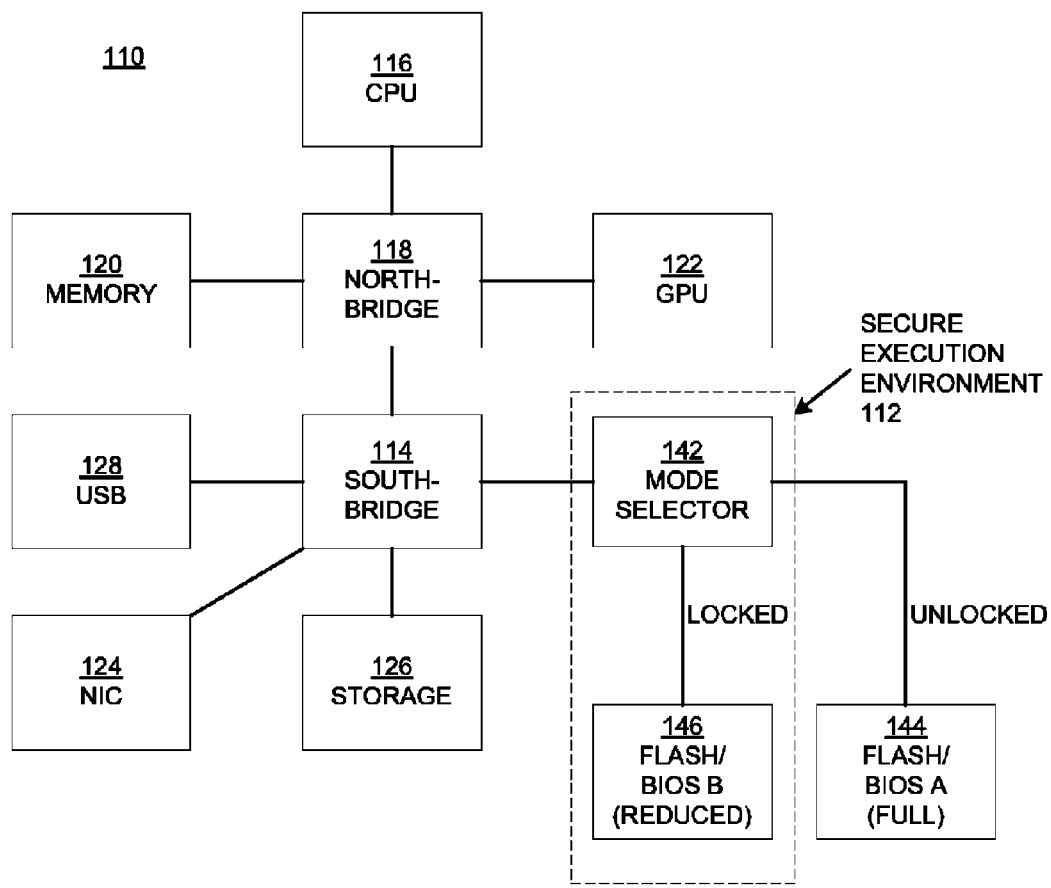
FIG. 1 is a block diagram showing one embodiment of a system that includes a locking mechanism.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "activating," "deactivating," "booting," "receiving," "detecting," "selecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

As described herein, an "electronic device" (e.g., a computing device or some other type of "intelligent"—processor-controlled—device including, but not limited to, a personal computer such as a laptop, desktop or notebook computer, a cell phone, a PDA, a portable media player and a video game player, and combinations thereof) may be "locked" in response to a "locking policy" (which is described further in conjunction with FIG. 2, below). When locked, the device is made to operate in some type of "limited" or "reduced-function" mode. In general, the terms "limited mode," "reduced-function mode" and the like refer to less than normal functionality and include the case of zero functionality. For example, when the device is operating in limited mode, the device may not be able to operate at all, or certain of its component devices may be locked or made to operate with reduced functionality, e.g., the central processing unit (CPU) may be slowed down or powered off, less memory or no memory may be made available, peripheral devices may not work, the device may automatically freeze and/or reboot every N minutes, and so forth. Software executing on the device may also be limited in its functionality or ability to execute.

One way that a locked state (e.g., limited functionality) may be accomplished is by having the device boot up using a boot instruction path other than the normal boot instruction path. In one such embodiment, two different boot paths are implemented on a general purpose computing system using two different BIOS (basic input/output system) stacks or codings—namely, a normal or full-function BIOS, and an HLM (hardware locking mode/hardware locked mode/hardware limiting mode) or reduced-function BIOS. A hardware-based mechanism can be used to control which BIOS coding is in effect. However, a locked state can be implemented in a device that uses a single BIOS.

FIG. 1 shows an embodiment in which an electronic device (system 110) includes a secure execution environment 112. In its most basic configuration, the system 110 also includes at least one processing unit (e.g., a CPU) 116 and a memory 120. Depending on the exact configuration and type of device, the memory 120 may be volatile (such as RAM), non-volatile (such as ROM, flash memory, etc.) or some combination of the two. The system 110 may also have additional features/functionality. For example, the system 110 may also include additional storage (removable and/or non-removable) including, but not limited to, magnetic or optical disks or tape. Such additional storage is exemplified in FIG. 1 as the storage 126. The system 110 may also have input device(s) (not shown) such as a keyboard, mouse, pen, voice input device, touch input device, etc. Output device(s) (not shown) such as a display, speakers, printer, etc., may also be included. The system 110 may operate in a networked environment using logical connections to one or more remote servers. The logical connections may include a local area network (LAN) and a wide area network (WAN), but may also include other types of networks. Such networking environments are commonplace in offices, enterprise-wide computer networks, intranets and the Internet. When used in a networking environment, the system 110 can be connected to the network through the NIC 124.

In the example of FIG. 1, the secure execution environment 112 is coupled to other components via a Southbridge chip 114, and the CPU 116 is coupled via a Northbridge chip 118 to memory 120 and a graphics processing unit (GPU) 122. In the example of FIG. 1, the Southbridge chip 114 is connected to a network interface card (NIC) 124 for remote connectivity, to the storage 126, and to other ports for device connectivity, exemplified as the universal serial bus (USB) interface 128.

The secure execution environment 112 can be provided in a variety of different ways. One way is to incorporate at least part of the secure execution environment 112 into a hardware component on the motherboard, such as the CPU 116, that is chosen such that the expense of replacing the component makes tampering impractical and/or because the device would be unusable without repair. Another way is to closely couple the secure execution environment 112 with other motherboard components, such that full-function operation is permitted only if (possibly complex) heartbeats from the secure execution environment are received at one or more other motherboard components, thereby indicating that the secure execution environment is present and operational.

FIG. 1 illustrates only an example of a system architecture; alternatives may include an architecture in which the secure execution environment 112 is linked to the Northbridge chip 118 and/or the USB interface 128, which would enable the operating system to interact with its components via a standard device driver model. Other alternatives include an architecture in which at least part of the secure execution environment 112 is incorporated into a motherboard chip, such as the CPU 116 or a memory controller (not shown).

In the example of FIG. 1, two different boot paths are exemplified, including a boot to a normal (full function) operational state via flash/BIOS A 144, and a boot to a limited (reduced function) operational state via flash/BIOS B 146. There may be additional boot paths for additional states, and other ways to execute different sets of boot instructions. For simplicity of discussion, only the case involving normal versus limited boot paths is explained herein; this discussion can be readily extended to implementations that use more than two boot paths.

In the example of FIG. 1, the normal boot BIOS A 144 may reside outside the secure execution environment 112 because, as will be seen, security in a multi-BIOS environment can be provided using the limited boot BIOS B 146. This allows, for example, the use of a conventional BIOS chip without having to integrate its code into the secure execution environment 112.

In one embodiment, the secure execution environment 112 includes a mode selector 142. In general, at bootup, the mode selector 142 chooses between a locked state and an unlocked state. In one particular embodiment, illustrated in FIG. 1, the mode selector 142 can select either a full-function boot path or a reduced-function boot path (e.g., either flash/BIOS A 144 or flash/BIOS B 146, respectively). The mode selector 142 can include, or can be coupled to, a non-volatile storage so that knowledge of whether to enter a locked state or an unlocked state survives a power-off state. For example, a flag can be set to indicate which state (locked or unlocked) to enter on the next boot.

Figure 2:
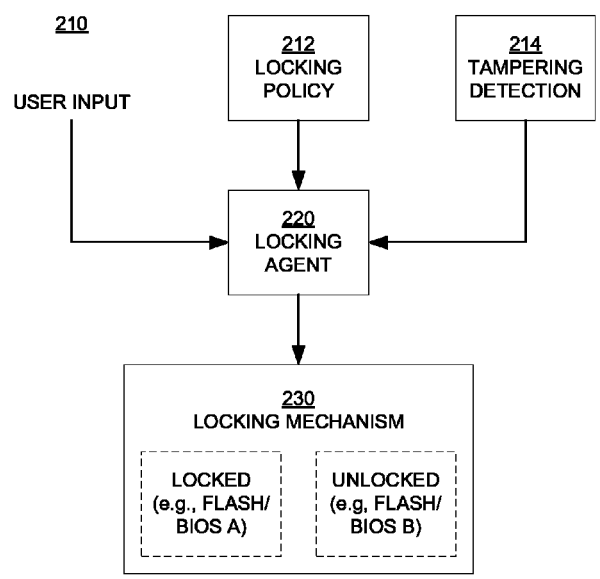
FIG. 2 is a block diagram showing one embodiment of a system for locking a device.

FIG. 2 is a block diagram showing one embodiment of a system 210 for locking a device. Aspects of the system 210 can be implemented as computer-executable components stored in a computer-readable medium. Also, aspects of the system 210 can be included within the secure execution environment 112 of FIG. 1.

In the example of FIG. 2, the system 210 includes a locking agent 220 that enforces a locking policy 212 via a locking mechanism 230. In general, the system 210 provides a user with the ability to lock his or her device, either manually or automatically through the locking policy 212. Significantly, the locking policy 212 is defined and enforced completely on the "client side." That is, the locking policy 212 can be defined and enforced using information and/or functionality available on the device without requiring access to another device such as a server. This is not to say that contact between the device and a device such as a server is precluded, but only that such contact is not required in order to lock or unlock the device. Thus, a device can be locked and unlocked without depending on another (e.g., external or remote) device (e.g., a server).

Furthermore, the locking policy 212 is beyond the control of the immediate user (unless that user is the rightful user). That is, the authorized user can set the locking policy 212, but a subsequent user cannot change the locking policy. For example, the locking policy 212 can be encrypted and placed in a secure memory, for example, within the secure execution environment 112 (FIG. 1).

The locking policy 212 of FIG. 2 can take many different forms. For example, a policy can be set to lock the device at a certain point in time, or after a certain period of time. A policy can be set to lock the device if the device loses connectivity with a certain network for a specified period of time. A policy can be set to lock the device if the device does not receive a signed and/or encrypted confirmation message from a certain device (e.g. a server) or network. A user input (e.g., a manual action performed by the immediate user) can also be used to lock the device.

The locking policy 212 can also specify how long the device is to remain locked after it has been locked. For example, a policy can be set to unlock the device at a certain point in time. At that point in time, the device may be completely unlocked. Alternatively, the device may unlock into a limited mode while the device communicates with, for example, a server to ensure that the device is in compliance; after successful authentication from the server, full functionality is enabled. If, for example, the server is not available, the user can contact a customer service representative to manually unlock the device once the user is properly authenticated. In a similar vein, a policy can be set to unlock the device at a prescribed point in time; however, the device remains unlocked only for a relatively short period of time while it waits for some type of confirmation that it can remain unlocked. Absent that confirmation, the device is automatically relocked and the process repeated at some future time.

The policy can also identify how the device can be unlocked if, for example, the device is inadvertently locked or access to the device is needed before the lock is due to expire. As mentioned above, when locked, the device can be placed in a limited operational state—in other words, though locked, the device can still retain some degree of functionality. Such functionality can include the ability to initiate contact with a certain device (and perhaps only that device) that can unlock the device if the immediate user can successfully respond to a challenge (e.g., by entering the correct password). In general, the requirements to exit the locked state will vary depending on what the locking agent 220 communicated to the locking mechanism 230 when the locked state was entered.

To enter the locked state, the locking agent 220 can force a reboot, e.g., via a reset NMI (non-maskable interrupt). As part of the reboot, a flag (mentioned above) can be set in non-volatile memory to identify that the locked state is to be entered. In one embodiment, the locking mechanism 230 is implemented using the mode selector 142 of FIG. 1. In such an embodiment, as described above, the mode selector 142 selects either a locked state or an unlocked state depending on the value of the flag.

In one particular implementation, the mode selector 142 selects a boot path (e.g., either a full-function flash/BIOS A 144 or a reduced-function flash/BIOS B 146) depending on whether the device is supposed to be entering the unlocked state or the locked state. The reduced-function BIOS can provide sufficient functionality to unlock the device if needed or desired. For example, the reduced-function BIOS may support keyboard and mouse operations and provide some display capability in order to permit a challenge-response dialogue between the device and a user, or it may permit an exchange of messages between the locked device and another device.

In one embodiment, the system 210 includes a tampering detection mechanism 214 that provides the capability to detect attempts to circumvent the locking policy 212 and/or the locking mechanism 230 in order to prevent the device from being locked or to unlock the device in an unauthorized manner. The tampering detection mechanism 214 can, for example, determine if a BIOS is being rewritten or if the frequency of a controlling clock is altered (e.g., increased so that the device is unlocked before it is scheduled to be unlocked in real time).

The locking policy 212 and locking mechanism 230 may also be associated with each component device (e.g., peripheral device) that is part of the larger device being secured, so that if the component device is removed it is not accessible or functional. For example, the locking mechanism 230 can be associated with each data storage device (e.g., the storage 126 of FIG. 1) so that if the storage device is removed and connected to another device, the data stored on the storage device is not compromised. This can be accomplished in a number of different ways. For example, to ensure that a hard drive is not removed and its data accessed, an existing password protection mechanism for the hard drive can be used, but the password is instead provided by the secure execution environment 112 (FIG. 1). Another approach would be to modify the hard drive to require attestation of the secure execution environment 112 using certificates that are the root of trust for the locking policy 212. In general, if a component device is locked (e.g., made inaccessible or non-functional) while it is a part of the larger device, then that component device can only be unlocked while it is still a part of the larger device, such that the component device remains locked even if removed from the larger device.

Figure 3:
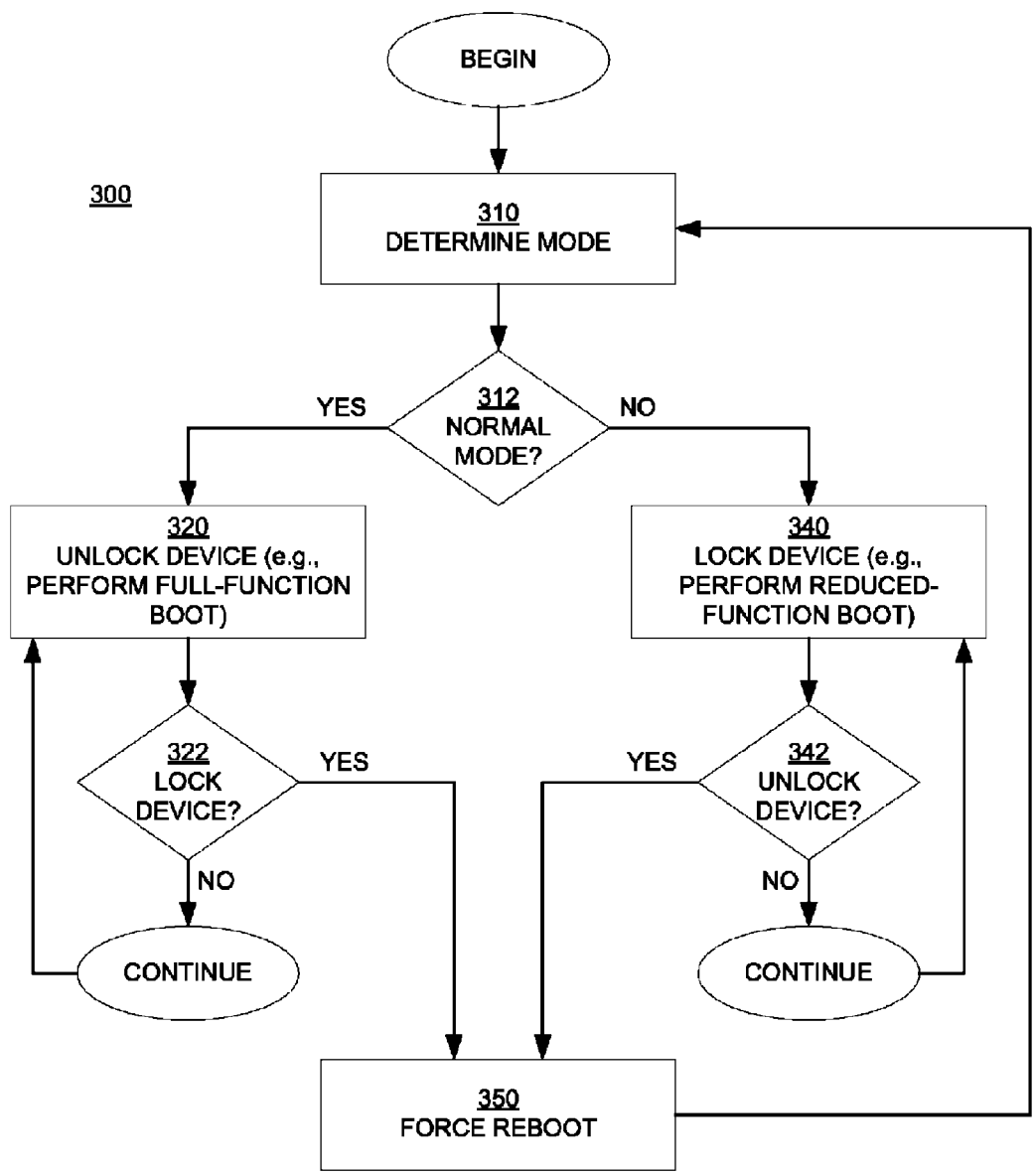
FIG. 3 is a flowchart of one embodiment of a method for locking a device.

FIG. 3 is a flowchart 300 of one embodiment of a method for locking a device. Although specific steps are disclosed in the flowchart 300, such steps are exemplary. That is, various other steps or variations of the steps recited in the flowchart 300 can be performed. The steps in the flowchart 300 may be performed in an order different than presented. Furthermore, the features of the various embodiments described by the flowchart 300 can be used alone or in combination with each other. In one embodiment, the flowchart 300 can be implemented by the system 110 (FIG. 1) as computer-executable instructions stored in a computer-readable medium.

In block 310 of FIG. 3, a determination is made as to whether the device is to be placed in a locked state or an unlocked state. This determination can be made based on, for example, a flag bit that has been set in non-volatile storage—if the bit has one value, a normal (unlocked or full-function) mode can be implemented, and otherwise a limited (locked or reduced-function) mode can be implemented. As described above, in one particular implementation, the full-function mode can be implemented using a full-function BIOS and the reduced-function mode can be implemented using a reduced-function BIOS.

If this is the first time that the device is being used, then the flag can be set by the manufacturer; otherwise, the flag can be set as part of a forced reboot, as described above. The flag may also be set in response to some type of user action or input.

In block 312, if a normal (unlocked) mode is to be implemented, then the flowchart 300 is directed to block 320; otherwise, the flowchart is directed to block 340.

In block 320, as previously described herein, the device is not locked and operates in full-function mode. In one implementation, a normal boot path is followed in the unlocked state. In block 322, a locking policy dictates whether the device is to be locked. Examples of a locking policy are presented above. If the device is not to be locked, then operation continues in the unlocked (full-function) mode and the flowchart 300 returns to block 320. If the device is to be locked, then the flowchart 300 proceeds to block 350.

In block 340, as previously described herein, the device is locked and operates in reduced-function mode. In one implementation, a reduced-function boot path is followed to implement the locked state. In block 342, the locking policy dictates whether the device can be unlocked. More specifically, if a condition is satisfied, then the device can be unlocked. For example, if a certain amount of time has elapsed since the device was locked, or if an appointed time is reached, then the device can be unlocked. If the device cannot be unlocked, then operation continues in the locked (e.g., reduced-function) mode and the flowchart 300 returns to block 340. If the device cannot be unlocked, then the flowchart 300 proceeds to block 350.

In block 350, the device is forced to reboot as previously described herein. Subsequently, the flowchart 300 returns to block 310.

In summary, the owner of a device is given the ability to lock the device locally, either manually or automatically according to a user-defined policy. The lock is implemented in hardware—for example, the locking mechanism can be incorporated into a hardware component that is chosen so that tampering or removal of the locking mechanism is either too expensive to be practical or renders the device unusable. Thus, the device is made more secure because, while locked, unauthorized use is prevented and unauthorized access to private information is thwarted. Moreover, if the device is stolen, its value is diminished because it will be unusable due to its locked state, while any attempt to remove the lock would result in the need for costly repairs.

The ability to lock a device has many practical applications. For data security on devices that contain sensitive or proprietary information such as computer systems, the computer systems can be made secure when left unattended because they cannot be made to boot into their full-function mode. Similarly, with regard to storage media associated with the locking mechanism, no hard drive or other storage media can be removed and read from another device. By way of example, computer systems used in a bank and containing sensitive personal financial data or access to financial systems can have a policy allowing them to be usable during banking hours but not when the bank is closed for business. Similarly, a locking policy can be designed to lock devices at regular intervals so that they need to be regularly unlocked. An example would be a laptop owned by a government agency and containing citizens' personal data can have a policy that certain storage volumes are accessible while traveling only with a periodic unlock, or at any time when the device is on the agency's network. For theft deterrence, by prominently displaying that the device is subject to being locked, a device can be left unattended in a kiosk or other public place with a greatly reduced probability of it being stolen. While the device is on a store shelf, it can be placed in a locked state; because the device would be inoperable if tampered with, shoplifting is discouraged. Also, hardware prototypes can be locked to increase the difficulty of reverse engineering.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for securing an electronic device, said method comprising:
   activating a locking mechanism on said device according to a locking policy that defines first and second conditions, wherein when said locking mechanism is activated, then said device operates in a limited mode of operation providing reduced device functionality compared to a normal mode of operation;
   determining that the first condition is satisfied and, in response, deactivating said locking mechanism while the device is operating in the limited mode of operation and placing said device into an intermediate mode of operation that is between said limited mode of operation and said normal mode of operation in terms of available device functionality; and
   determining that the second condition is satisfied while the device is in the intermediate mode of operation and, in response, placing the device into said normal mode of operation.

2. The method of claim 1 wherein the locking mechanism determines the second condition that must be satisfied to place the device into the normal mode of operation based on a manner in which the locking mechanism was activated to place the device in the limited mode of operation.

3. The method of claim 1 wherein activating the locking mechanism comprises activating said locking mechanism in response to at least one of:
   manual action by a user; or
   a time-based condition that is satisfied.

4. The method of claim 1 wherein activating the locking mechanism comprises activating said locking mechanism if connectivity between said device and another device is lost for a period of time prescribed in the locking policy.

5. The method of claim 1 wherein activating the locking mechanism comprises activating said locking mechanism if said device does not receive an expected message from another device.

6. The method of claim 1 wherein operating the device in a limited mode of operation comprises booting said device using reduced-function BIOS (basic input/output system) code, and wherein placing the device into said normal mode of operation comprises booting said device using full-function BIOS code.

7. The method of claim 1, wherein, when in the intermediate mode of operation, the device communicates with another device that is external to the device, and wherein the second condition is determined to be satisfied based on the communication with the other device.

8. The method of claim 1 wherein said activating said locking mechanism comprises causing a component of said device to operate with reduced functionality even if the component is removed from said device.

9. An electronic device comprising:
   a locking mechanism activated based on a locking policy controlled by a client-side authority of the device, the locking mechanism comprising a normal boot instruction path that provides a normal mode of operation when the locking mechanism is deactivated and a reduced-function boot instruction path that provides a limited mode of operation, that has reduced device functionality relative to the normal mode of operation, when the locking mechanism is activated;

a locking agent coupled to said locking mechanism, said locking agent configured to:

implement said locking policy to activate said locking mechanism to place the device in the limited mode of operation;

determine a deactivation condition based on activation of said locking mechanism, the deactivation condition comprising one or more requirements for deactivating said locking mechanism, wherein the locking agent is configured to vary the deactivation condition based on a manner in which the locking mechanism was activated to place the device in the limited mode of operation; and deactivate said locking mechanism when the deactivation condition is satisfied; and one or more computer processors, being a functional part of the electronic device, and activated by the locking agent to facilitate implementing the locking policy to activate the locking mechanism.

10. The electronic device of claim 9, wherein the reduced-function boot instruction path resides in a secure execution environment.

11. The electronic device of claim 10, wherein the normal boot instruction path is separate from the reduced-function boot instruction path and resides outside the secure execution environment.

12. The electronic device of claim 10, wherein the secure execution environment includes a mode selector that maintains an indication of one of the normal boot instruction path and the reduced-function boot instruction path to be selected on a next boot of the device.

13. The electronic device of claim 9, wherein the locking mechanism is deactivated upon receipt of an input at the electronic device.

14. The electronic device of claim 13, wherein the input comprises at least one of: an authorized signal received from another device and a user input provided through a user input device.

15. A computer system comprising:

a processor;

memory coupled to said processor;

a locking policy that is controlled by a client-side authority of the computer system;

a hardware-implemented locking mechanism coupled to said memory and configured to:

place the computer system into an unlocked state in which the computer system operates in a first mode of operation having first computing functionality, based on a mode selector controlled by the locking policy; and place the computer system into a locked state in which the computer system operates in a second mode of operation having second computing functionality that is reduced relative to the first computing functionality of the first mode of operation, based on the mode selector controlled by the locking policy, the locking mechanism and mode selector residing within a secure execution environment of the computer system; and a tampering detection mechanism configured to detect an unauthorized attempt to circumvent at least one of the locking policy and the locking mechanism.

16. The computer system of claim 15 wherein said locked state is selected when a time-based condition is satisfied.

17. The computer system of claim 15 wherein said locked state is selected if connectivity between said computer system and another device is lost.

18. The computer system of claim 15, wherein the locking policy is encrypted in a secure memory.

19. The computer system of claim 15, wherein the tampering detection mechanism is configured to facilitate prevention of the computer system from being placed into the unlocked state or the locked state in an unauthorized manner.

20. The computer system of claim 15, wherein the tampering detection mechanism is configured to determine if at least one of:

an attempt is being made to modify operation of BIOS (basic input/output system) code; and a frequency of a controlling clock is altered.

* * * * *